Sept. 9, 1952           E. G. ZEEB           2,610,085
SUN VISOR

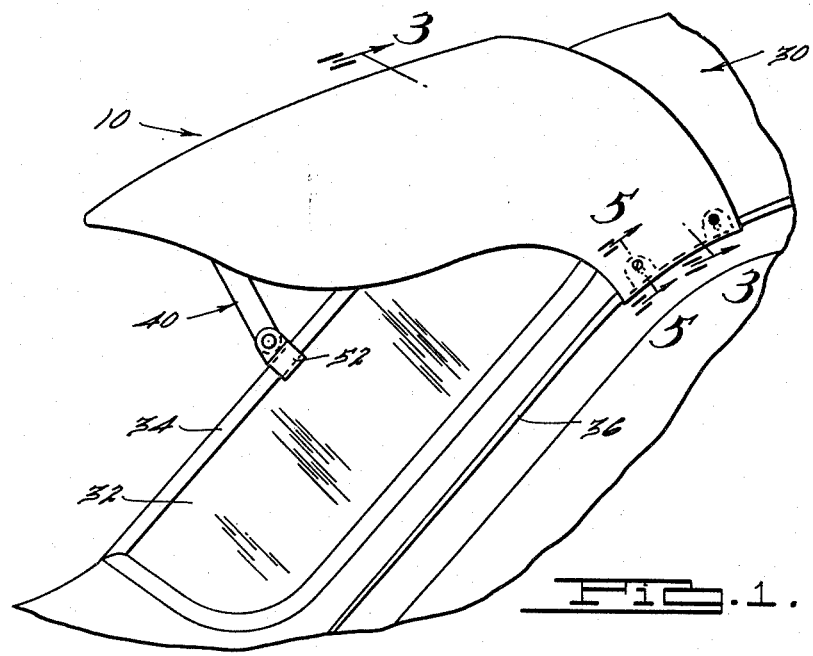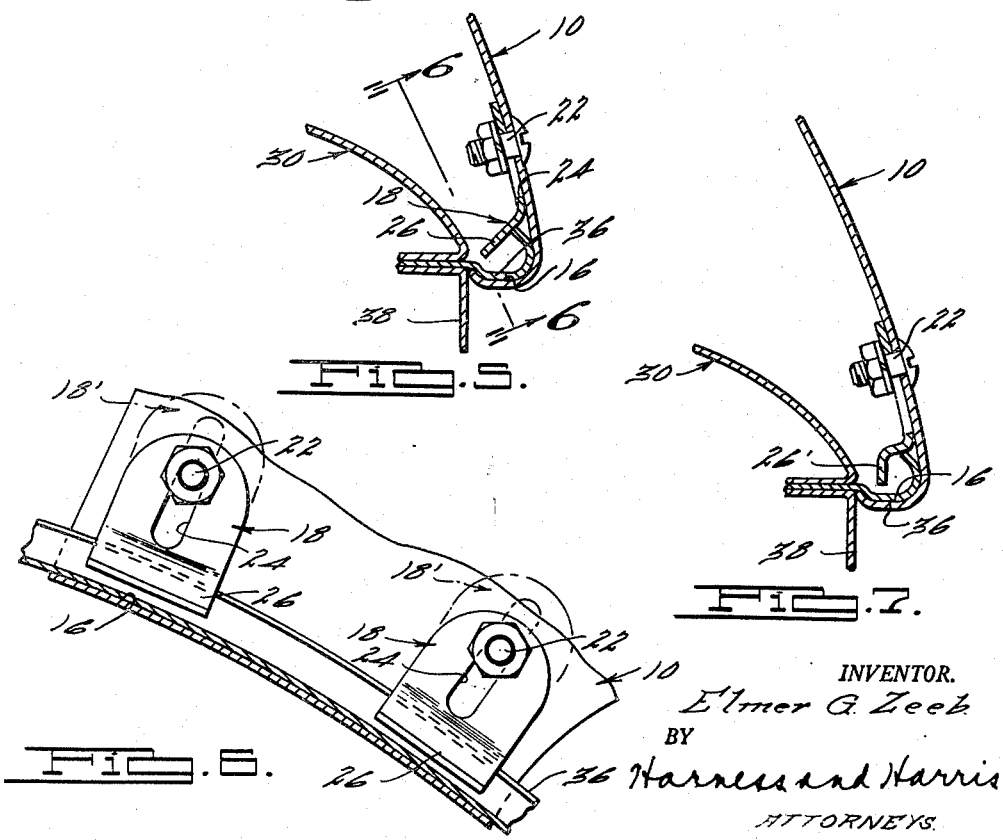

Filed April 30, 1948           2 SHEETS—SHEET 2

INVENTOR.
Elmer G. Zeeb
BY
Harness and Harris
ATTORNEYS

Patented Sept. 9, 1952

2,610,085

UNITED STATES PATENT OFFICE 2,610,085

SUN VISOR

Elmer G. Zeeb, Grosse Pointe Woods, Mich., assignor to Chrysler Corporation, Highland Park, Mich., a corporation of Delaware Application April 30, 1948, Serial No. 24,312

3 Claims. (Cl. 296—95)

This invention relates to sun visors or sun shades for automobiles, and more particularly to an arrangement allowing instantaneous application and removal of the visor.

The leaning in automotive design has been in recent years toward the streamline form. Consequently, windshield slope has become more and more marked and windshield area has become considerably enhanced. As incident to such body styling, the occupant of the vehicle finds his visible arc of elevation and his exposure to ray glare and heat greatly increased.

Shades and awnings have been resorted to, both interiorly and exteriorly of the windshield, in an effort to relieve the situation. By and large they have met with public favor, the drawback of the usual installation features notwithstanding. One installation drawback brought to mind is that the automobile finish may be marred if the drilling of holes is necessitated; and that it may be marred if clamping members, easily overtightened, are employed. In either case the actual attaching process is time consuming and requires use of certain adjusting tools to adapt the awning to fit the particular vehicle.

It is an object of this invention to provide a sun visor which may be quickly and easily attached to the outside of a vehicle.

Another object of the invention is to provide a sun visor which although adapted to be mounted adjacent the windshield of a vehicle, increases the wind resistance only very slightly when the car is traveling at high speed.

An additional object is to circumvent use of members requiring attaching holes in the vehicle body, as well as to avoid employment of surface-marring positive clamp-on members.

A further object of the invention is to provide a visor which not only has these special attributes, but which is also possessed of the usual attributes of simplicity and cheapness of manufacture.

These and other objects will be better understood when considered in connection with the following description and accompanying drawings which show a preferred embodiment and in which:

Fig. 1 is a partial side elevation of a vehicle onto which the visor has been applied;

Fig. 5 is an end section showing the keeper means;

Fig. 6 is a plan of the keeper means installed; and

Fig. 7 shows a modified form of keeper means.

Figure 2:
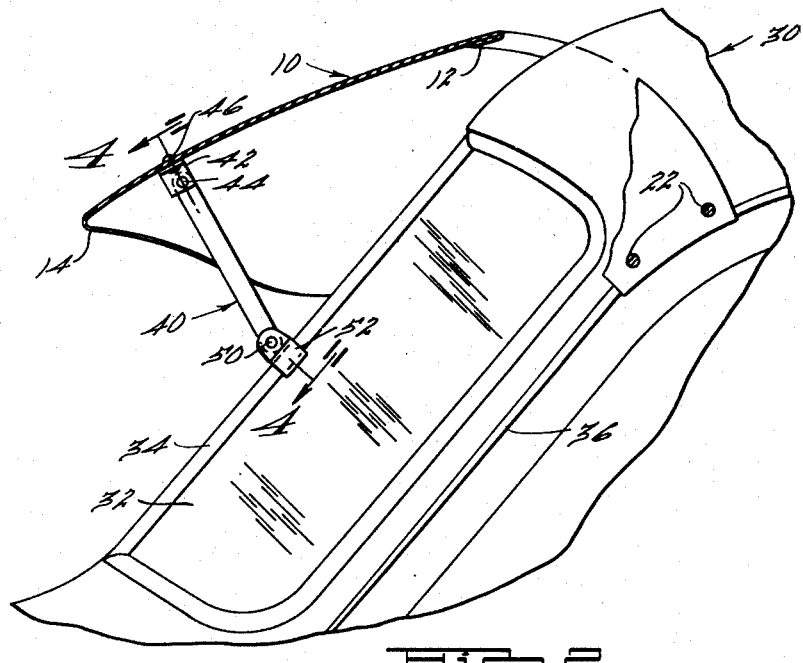
Fig. 2 is the same view as Fig. 1 with the visor partly broken away.

According to the illustrated layout of Figs. 1 and 2, 10 generally indicates the sun visor applied to a vehicle 30 having a sloping windshield 32 divided by a windshield center strip 34. Bordering each side of the windshield and conforming to the general body contour of the vehicle is a drip molding or gutter 36.

Figure 3:
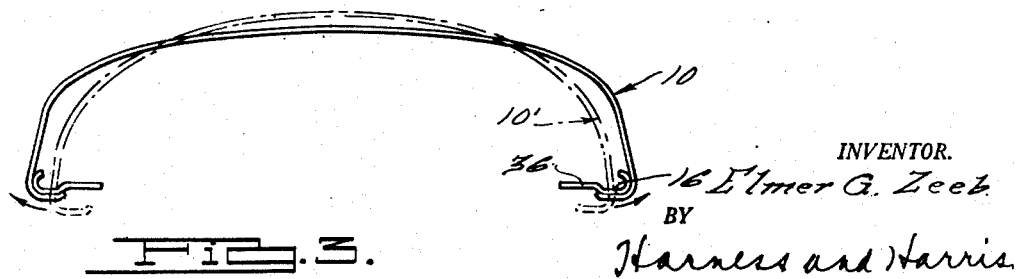
Fig. 3 is a schematic diagram showing the spring action principle.

The visor proper presents a substantially rectangular developable surface which has been bowed or arched longitudinally. Composed of a semi-rigid spring material, this visor acts, as can be seen from Fig. 3, in the manner of a flat C-spring. The phantom lines 10' show the visor in repose while the solid line showing 10 is of the visor after it has been extended and sprung on over the moldings 36. Naturally the flat-spring action of the central portion resists any forced additional separation of the spring terminals and when the spring is forcibly extended urges the terminals toward one another. It is to be noted in passing also in Fig. 3, that as more bow is artificially introduced into the arch, the terminals tend to be forced closer together.

From Fig. 2, it may be seen that the profile of the visor conforms generally to the streamline appearance of the vehicle contour. The central portion is strengthened at its top edge by a flanged margin turned back on itself to form the stiffener 12. At the bottom edge is the stiffener roll or bead 14 which may by appropriate bending be formed integrally thereof. The normal springing effect is greatened by means of 12 and 14.

Figure 4:
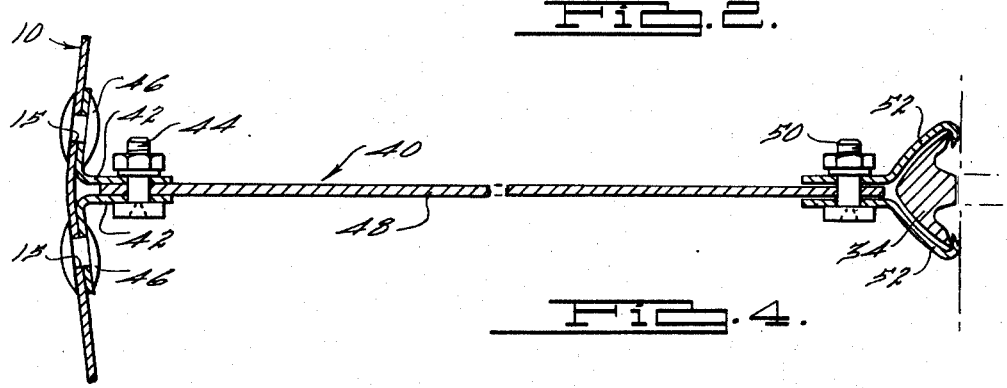
Fig. 4 is a section through the center brace.

Partly to supplement the rigidity imparted by the stiffeners and to help restrain the visor, a center brace 40 may be interposed at the center of the arch at holes 15 indicated in Fig. 2. The brace bears on center strip 34 and serves positively to maintain the spacing of the visor relative to the vehicle, acting effectively as a compression member or a tension member as the situation demands. As may be seen from Fig. 4, the visor end of 40 is pinned to its bracket 42 by bolt 44, the brackets being riveted to 10 through 15 by fasteners. The main portion 48 of brace 40 is pinned at its other end by an adjustable bolt 50 to its spanning brackets 52 which bridge over the center strip 34 of the windshield. When bolt 50 is tightened down, it imparts a clamshell action to brackets 52 which then hug strip 34 and resist any longitudinal movement therealong. Yet bolt 50 makes possible an adjustment whereby the windshield end of 40 may be predeterminably positioned along the center strip with the result that the spacing between the visor and the windshield may be changed.

In reference to Fig. 5, the terminals of the visor have marginal corrugations giving them a gutter-like effect. Jaws or bites 16 formed therein are adapted to fit over the outside of drip molding 36, conforming thereto as regards the curvature of the axis of the molding. The bites 16 are seen to extend complementally around the molding transversely also and hug in to establish contact with the side 38 of the vehicle.

Once applied, the natural spring of the visor causes it to catch and retain hold on the moldings in a self-sustaining relation. If the center brace is used, auxiliary support and restraint is lent to the visor. However, undue loads may be experienced which tend to slide the bites longitudinally along the molding—such loads as imposed by an accidental outside force or by excessive wind force occasioned by high vehicle speed. To forestall any longitudinal shift, retainers or keepers 18 may be provided for the terminals of the visor, comprising brackets adjustably attached thereto by bolts 22 passing through slotted apertures 24. The free end of keeper 18 serves as a tang 26 which abuts the edge of molding 36, thus affording a safety measure. The provision of this keeper means also lessens, same as does the center brace, the susceptibility of the visor to ready detachment by would-be thieves or to being torn off from spasmodic outside influences.

The procedure to be followed in connection with the keepers normally will consist of retracting and bolting them there in a position 18' removed from the bites. The visor is then sprung over such that the bites 16 snap-on into position. Thereupon, as may be gathered from Fig. 6, the bolts 22 may be loosened in order that keepers 18 can be slid along their slots 24 until each tang 26 rests on the lip of molding 36. After they have thus dropped down into final position, a tightening of the bolts 22 maintains the keepers in a contact with the lip of the molding whereby a binding effect results from any attempted longitudinal motion along the molding or from action of accidental forces tending to dislodge bites 16.

Fig. 7 illustrates a modified form of tang 26' whose terminal has a more exaggerated bend around the lip of molding 36. The resulting S-shape has been ascribed in order that the molding is hugged closer such as better to anticipate accidental dislodgment forces.

It is the intention of this invention that the visor proper be preformed for each applicable make and model vehicle. It may be composed of a resilient metal-like material made into a single sheet stamping. Being of predetermined shape, the visor will amply span the windshield with its arch permitting free passage of air beneath it. The stamping process will have been prearranged to incorporate the proper flex to the visor and to impart the approximate desirable tilt angle relative to the windshield. Any fine adjustments sought for the tilt angle may be made by varying the position of center brace 40 along the strip 34. Such an adjustment accomplishes a two-fold purpose actually, for as noted in the discussion of Fig. 3, additional bow urges the terminals of 10 closer together; hence during installation, as brace 40 is adjusted so as to move the visor farther away from the windshield, it causes the terminals of the visor to be urged to hook in more around the moldings with a supplemental claw or tongs-like action.

If vigorous dislodging forces are anticipated, they may be prepared for and withstood with the component parts of the visor cooperating in the following indirect, rather than the hereinbefore described direct, manner. To produce an excessive amount of flex into the visor requires that the center portion be additionally spaced from the windshield and that greater outward force be exerted by the brace. Efforts made in such a direction will tend to slide the visor gutters along the moldings save for the binding effect of the keepers. This keeper action becomes more pronounced in proportion to the axially directed force and effectually locks the gutter-molding surfaces against relative motion. Thus is made possible the introduction of an over amount of bow to the visor and consequent exaggerated squeezing effect imparted to the moldings to prevent dislodgment of the visor. Of course, when the external separating influences equal or exceed the pre-loaded compression force as induced in the center brace, the brace proceeds then to act as a tension member to offer resistance to further disturbance.

While I have hereinabove described and in the drawings have illustrated many details of construction, modifications thereof or other structures mechanically equivalent to those thus described and illustrated will be obvious to those skilled in the art and I am not to be limited to the details of construction illustrated or described.

What is claimed is:

1. For use with a vehicle characterized by drip molding having inboard and outboard surfaces, a windshield bordered at the sides by the drip molding, and mounting a flexible snap-on sun visor having a resilient body and integral end portions formed with guttered terminals receiving the outboard surfaces of the drip molding and bearing thereon with a spring-like squeezing action; a keeper means, said keeper means comprising pairs of brackets at the respective end portions of the sun visor; each said bracket having a longitudinal body portion attached adjacent said visor terminals in juxtaposed contact therealong, an elongated aperture in the body portion, and a free end; said free end being spaced from its corresponding visor terminal and providing a tang adapted to abut an inboard surface of said drip molding; said elongated aperture affording an adjusting means whereby said tang may be positioned snugly relative to said inboard surface in order abuttingly to bear thereupon; each said bracket being independently adjustable to implement the abutting relationship just described.

2. For use with a vehicle characterized by drip molding having inboard and outboard surfaces, a windshield bordered at the sides by the drip molding, and mounting a flexible snap-on sun visor having a resilient body and integral end portions formed with guttered terminals receiving the outboard surfaces of the drip molding and bearing thereon with a spring-like squeezing action; a keeper means, said keeper means comprising pairs of brackets at the respective end portions of the sun visor; each said bracket having a longitudinal body portion attached adjacent said visor terminals in juxtaposed contact therealong, an elongated aperture in the body portion, and a free end; said free end being spaced from its corresponding visor terminal and providing a tang adapted to abut an inboard surface of said drip molding; said tang being formed to curve around said inboard surface of the drip molding in an S-configuration and said elongated aperture affording an adjusting means whereby said tang may be positioned snugly in curving around said inboard surface in order abuttingly to bear thereupon; each said bracket being independently adjustable to implement the abutting relationship just described.

3. For use with a vehicle characterized by drip molding having inboard and outboard surfaces, a windshield bordered at the sides by the drip molding, and mounting a flexible snap-on sun visor having a resilient body and integral end portions formed with guttered terminals receiving the outboard surfaces of the drip molding and bearing thereon with a spring-like squeezing action; a keeper means, said keeper means comprising pairs of brackets at the respective end portions of the sun visor; each said bracket having a longitudinal body portion attached adjacent said visor terminals in juxtaposed contact therealong, an elongated aperture in the body portion, and a free end; said free end being spaced from its corresponding visor terminal and providing a flat tang angled with respect to said longitudinal body portion of the bracket and adapted to abut an inboard surface of said drip molding; said elongated aperture affording an adjusting means whereby said tang may be positioned snugly relative to said inboard surface in order abuttingly to bear thereupon; each said bracket being independently adjustable to implement the abutting relationship just described.

ELMER G. ZEEB.

REFERENCES CITED

The following references are of record in the file of this patent:

UNITED STATES PATENTS

| Number | Name | Date |
| --- | --- | --- |
| 692,501 | Bentley | Feb. 4, 1902 |
| 2,207,227 | Scott | July 9, 1940 |
| 2,318,143 | Cutting | May 4, 1943 |
| 2,326,267 | Vavroch | Aug. 10, 1943 |
| 2,334,856 | Atkinson | Nov. 23, 1943 |
| 2,475,901 | Kipp | July 12, 1949 |
| 2,495,860 | Miller | Jan. 31, 1950 |
| 2,500,406 | Greenfield | Mar. 14, 1950 |